I. C. REESOR.
SELF LOCKING SEAL FOR CARS, &c.
APPLICATION FILED SEPT. 27, 1907.

910,021.

Patented Jan. 19, 1909.

Isaac C. Reesor, Inventor

Witnesses

By

Attorney

UNITED STATES PATENT OFFICE.

ISAAC CHRISTIAN REESOR, OF DENVER, COLORADO, ASSIGNOR OF ONE-HALF TO HARRY W. ROBARE, OF DENVER, COLORADO.

SELF-LOCKING SEAL FOR CARS, &c.

No. 910,021.            Specification of Letters Patent.            Patented Jan. 19, 1909.

Application filed September 27, 1907. Serial No. 394,881.

*To all whom it may concern:*

Be it known that I, ISAAC CHRISTIAN REESOR, a citizen of the United States, residing at Denver, in the county of Denver and State of Colorado, have invented a new and useful Self-Locking Seal for Cars, &c., of which the following is a specification.

The invention relates to improvements in self locking seals for cars, packages, etc.

The object of the present invention is to simplify and improve the construction of self locking seals, and to provide means for positively preventing them from being rendered useless by the jars incident to rough handling in jumping on and off the cars and the like.

A further object of the invention is to provide a seal of this character, having a single locking spring adapted to positively lock the parts against accidental movement before the free end of the sealing strip is introduced into the casing or housing, and capable also of locking and positively retaining the free end of the sealing strip, when the same is inserted in the casing or housing.

The invention also has for its object to provide a construction adapted to be released by the insertion of the free end of the sealing strip in the casing or housing to permit the parts to be carried by the sealing strip to their locking position.

With these and other objects in view, the invention consists in the construction and novel combination of parts hereinafter fully described, illustrated in the acompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
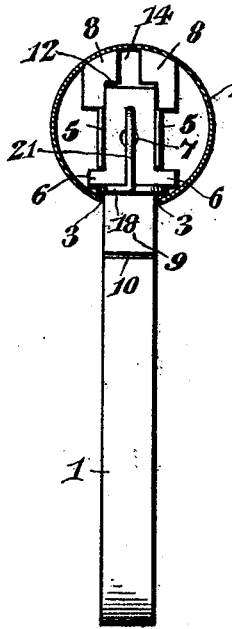
Figure 2:
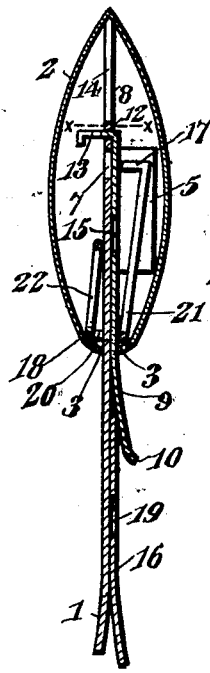
Figure 3:
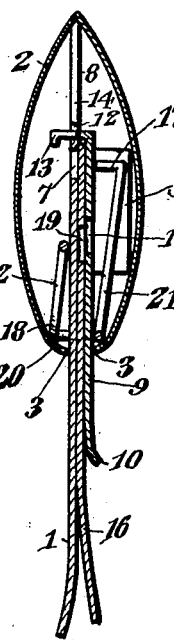
Figure 4:
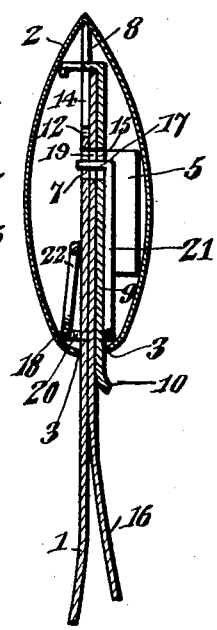
Figure 5:
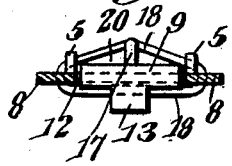
Figure 6:
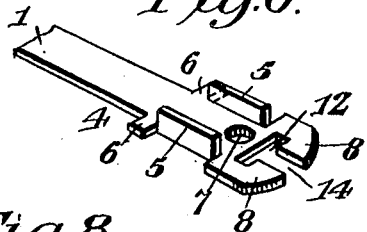
Figure 7:
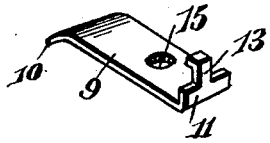
Figure 8:
Figure 9:
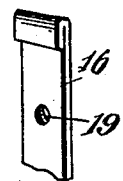

In the drawing:—Figure 1 is a plan view of a seal, constructed in accordance with this invention, the casing or housing being in section. Fig. 2 is a longitudinal sectional view of the same, illustrating the adjustment of the parts before the free end of the sealing strip is inserted in the casing or housing. Fig. 3 is a similar view, the free end of the sealing strip being introduced into the casing or housing a sufficient distance to release the inner end of the slide to permit the parts to be moved to their locked position. Fig. 4 is a longitudinal sectional view, the parts being in their locked position. Fig. 5 is an enlarged transverse sectional view, taken substantially on the line x—x of Fig. 2. Fig. 6 is a detail perspective view of the inner attached end of the sealing strip. Fig. 7 is a detail perspective view of the slide. Fig. 8 is a similar view of the locking spring. Fig. 9 is a detail view of the free end of the sealing strip.

Like numerals of reference designate corresponding parts in all the figures of the drawing.

1 designates a sealing strip, consisting of a thin metallic strap and having one of its ends secured within a circular casing or housing 2, preferably consisting of two substantially concavo-convex sections or members, secured together at their peripheries. The attached end of the sealing strip extends across the casing or housing from the front side or edge, which is provided with an entrance opening 3, and the end edges of the attached end are fitted against the interior of the casing or housing at a point diametrically opposite the entrance opening 3, and they are curved to conform to the configuration of the casing or housing, as clearly illustrated in Fig. 1 of the drawing.

The attached end of the sealing strip forms a support 4, and is provided at opposite sides with projecting parallel flanges 5, and it has laterally extending lugs 6, located at the front ends of the flanges 5, as clearly illustrated in Fig. 1 of the drawing. The support is provided between the flanges with an aperture 7 and it has a head 8, located in rear of the flanges. The support receives a longitudinally movable slide 9, consisting of a metallic strip or plate having its outer end 10 curved outwardly from the support, and provided at its rear end with a transverse flange 11, which is adapted to fit in a transverse slot 12 of the head 8, whereby the slide is locked against longitudinal movement to prevent the parts from being accidentally carried to their locked position by the jars and rough handling of the seals incident to jumping on and off cars and the like. The slide is also provided with a tongue 13, extending centrally from the flange 11 and operating in a longitudinal slot or opening 14, which extends rearwardly from the transverse slot 12. The tongue and the slot 14 guide the slide and prevent any lateral movement of the same. The slide is also provided with an aperture 15, which is arranged out of alinement with the aperture 7 before the free end 16 of the sealing strip is introduced into the casing, and it is adapted to be moved rearwardly by the free end of the sealing strip to carry its opening 15 into register with the opening 7 of the support to permit the engaging portion 17 of a spring 18 to extend through the said apertures 15 and 7 and also through an aperture 19 of the free end of the sealing strip. The free end of the sealing strip is doubled on itself at its extremity to stiffen it and prevent its edge from being bent or deflected.

The spring, which retains the rear end of the slide in its interlocked relation with the support, is constructed of resilient wire, or other suitable material, and it consists of a transverse loop 20 and a longitudinal tongue or stem 21, having the engaging portion 17. The stem or engaging portion 21 extends centrally from one side of the loop, and the latter is provided at the center of the opposite side with a short arm 22, which bears against the adjacent face of the support. The transverse loop 20 of the spring encircles the support and fits against the laterally extending lugs, and the engaging end 17 of the stem or tongue is bent inwardly at right angles, as shown, and is located opposite the aperture 7 of the support, an imperforate portion of the slide being interposed between the engaging portion 17 of the spring and the aperture 7 for holding the said engaging portion in position for engaging the free end of the sealing strip, when the latter is introduced into the casing or housing. The transverse flange 11 of the slide not only constitutes means for engaging the transverse slot of the support, but it is also adapted to be engaged by the sealing strip, whereby the slide is moved inwardly or rearwardly to carry its aperture 15 into register with the aperture 7 of the support. The engaging end of the spring bears against the slide and maintains the flange 11 in engagement with the transverse slot 12 until the free end of the sealing strip is introduced into the casing or housing. The free end of the sealing strip, when introduced into the casing or housing, is interposed between the slide and the support, and it thereby lifts the flange 11 from the slot 12. The loop of the spring by encircling the slide and the support constitutes a guide for the latter, and it also serves as a guide for the free end of the sealing strip.

The seal while being designed principally for sealing railroad cars may be advantageously employed on packages and various other places where a seal of this character is desirable.

Having thus fully described my invention, what I claim as new and desire to secure by Letters Patent, is:—

1. A self locking seal comprising a casing, a sealing strip connected at one end with the casing, a spring located within the casing and provided with means for engaging and locking the other end of the sealing strip, and a slide for holding the spring in an unlocked position, said slide being separate from the spring and arranged to be actuated by the free end of the sealing strip to permit the spring to engage the same.

2. A self locking seal comprising a casing, a sealing strip, a support arranged within the casing, a locking spring provided with means for engaging and locking the sealing strip, and a slide for holding the engaging portion of the spring in an unlocked position and movable longitudinally independently of the spring to release the latter and arranged to be actuated by the sealing strip to cause the spring to engage the latter.

3. A self locking seal comprising a casing, a sealing strip secured at one end within the casing and having its attached end forming a support, a locking spring mounted on the support and provided with means for engaging and locking the other end of the sealing strip, and a slide for holding the spring in an unlocked position and movable longitudinally independently of the spring to release the latter, said slide being arranged to be actuated by the sealing strip to permit the spring to engage the same.

4. A self locking seal comprising a casing, a sealing strip, a support arranged within the casing, a locking spring mounted on the support and provided with means for engaging the sealing strip, a slide for holding the locking spring in an unlocked position, and means for interlocking the slide with the support to prevent accidental movement of the former before the sealing strip is introduced into the casing, said slide being disengaged from the support by the sealing strip and being actuated by the latter to release the spring.

5. A self locking seal comprising a casing, a sealing strip, a support located within the casing, a locking spring mounted on the support for engaging and locking the sealing strip, a slide for holding the spring in an unlocked position, said slide being provided with means for engaging the support and retained in such engagement by the said spring and disengaged therefrom by the sealing strip when the latter is inserted in the casing.

6. A self locking seal comprising a casing, a sealing strip, a support arranged within the casing and provided with a slot, a spring provided with means for locking the sealing strip, and a slide for holding the spring in an unlocked position provided with a flange held in engagement with the slot of the support by the said spring for holding the slide against accidental movement, said flange being adapted to be disengaged from the slot by the sealing strip.

7. A self locking seal comprising a casing, a sealing strip, a support provided with a transverse slot and having a longitudinal opening, a spring mounted on the support for locking the sealing strip, a slide for holding the spring in an unlocked position, said slide being provided with a transverse flange for engaging the slot and having a tongue operable in the longitudinal opening.

8. A self locking seal comprising a casing, a support, a sealing strip, a spring mounted on the support and provided with means for engaging and locking the sealing strip, and a slide provided with means for interlocking it with the support and interposed between the same and the spring and retained in its interlocked relation by the latter and arranged to be moved out of such interlocked relation and also to be carried out of engagement with the spring by the sealing strip.

9. A self locking seal comprising a casing, a sealing strip, a support, a locking spring having a transverse loop encircling the support and provided with a stem having an engaging portion, a slide also encircled by the loop and interposed between the engaging portion and the support for holding the spring in an unlocked position, said slide being adapted to be actuated by the sealing strip to permit the spring to engage the latter.

10. A self locking seal comprising a casing, a support having an aperture, a sealing strip connected at one end with the casing and provided at its free end with an aperture, a locking spring having means for engaging the apertures of the support and the sealing strip to lock the latter, a slide movable longitudinally of the sealing strip and provided with an aperture to register with the said apertures and having an imperforate portion interposed between the locking spring and the aperture of the support, said slide being arranged to be actuated by the sealing strip to release the spring.

11. A self locking seal comprising a casing, a sealing strip, a support provided with guide flanges and having laterally extending lugs located in advance of the said flanges, a locking spring arranged to engage the sealing strip and having a loop encircling the support and fitting against the laterally extending lugs, and a slide movable through the loop of the spring and guided between the said flanges and arranged to hold the spring in an unlocked position, said slide being adapted to be actuated by the sealing strip to release the spring.

12. A self locking seal comprising a casing, a sealing strip secured at one end within the casing to form a support and provided with an aperture and having longitudinal guide flanges and provided in rear of the same with a head having transverse and longitudinal slots, said sealing strip being also provided at its free end with an aperture, a spring mounted on the support and having an engaging portion located opposite the aperture of the support and adapted to engage and lock the sealing strip, a slide operating between the guide flanges of the support and interposed between the aperture thereof and the engaging portion of the spring and provided at its rear end with a transverse flange adapted to engage the transverse slot of the support and having a tongue operable in the longitudinal support, said slide being adapted to be actuated by the free end of the sealing strip to permit the spring to engage the aperture of the latter.

13. A self locking seal comprising a casing, a sealing strip connected at one end with the casing, a support arranged within the casing, a locking spring having an engaging portion movable toward and from the support and arranged to lock the other end of the sealing strip, and a movable member interposed between the engaging portion of the spring and the support and arranged to be actuated by the free end of the sealing strip to release the spring to permit the same to engage the sealing strip.

14. A self locking seal comprising a casing having an entrance opening, a sealing strip connected at one end with the casing, the other end of the sealing strip being adapted to be inserted in the opening of the casing, a locking spring mounted within the casing and having its plane of movement intersecting that of the sealing strip and provided with means for engaging and locking the latter, and a movable member receiving the engaging portion of the spring for holding the latter out of engagement and arranged in the path of the sealing strip and actuated by the same to release the engaging portion of the same to permit the same to lock the sealing strip.

In testimony, that I claim the foregoing as my own, I have hereto affixed my signature in the presence of two witnesses.

ISAAC CHRISTIAN REESOR.

Witnesses:
 THOMAS R. WOODROW,
 HARRY E. KELLY.